US012265388B2

(12) United States Patent
Yap et al.

(10) Patent No.: US 12,265,388 B2
(45) Date of Patent: Apr. 1, 2025

(54) TACTICAL ADVANCED ROBOTIC ENGAGEMENT SYSTEM

(71) Applicant: ST ENGINEERING ADVANCED MATERIAL ENGINEERING, Singapore (SG)

(72) Inventors: De Tao Francis Yap, Singapore (SG); Ee Kiat Lovell Ong, Singapore (SG); Jia Qi Liew, Singapore (SG); Yan Chien Chuan, Singapore (SG); Man Yun Michelle Cheng, Singapore (SG); Fook Heng Benjamin Ho, Singapore (SG)

( * ) Notice: Subject to any disclaimer, the term of this patent is extended or adjusted under 35 U.S.C. 154(b) by 214 days.

(21) Appl. No.: 17/904,012

(22) PCT Filed: Feb. 11, 2021

(86) PCT No.: PCT/SG2021/050074
§ 371 (c)(1),
(2) Date: Aug. 11, 2022

(87) PCT Pub. No.: WO2021/162641
PCT Pub. Date: Aug. 19, 2021

(65) Prior Publication Data
US 2023/0097676 A1    Mar. 30, 2023

(30) Foreign Application Priority Data
Feb. 11, 2020   (SG) .......................... 10202001213X (51) Int. Cl.
*G05D 1/00*   (2024.01)
*G05D 1/223*   (2024.01)
*G05D 1/224*   (2024.01)

(52) U.S. Cl.
CPC ......... *G05D 1/0038* (2013.01); *G05D 1/0016* (2013.01); *G05D 1/027* (2013.01);
(Continued)

(58) Field of Classification Search
CPC .... G05D 1/0038; G05D 1/0016; G05D 1/027; G05D 1/0278; G05D 1/223;
(Continued)

(56) References Cited

U.S. PATENT DOCUMENTS

| 5,864,481 A | * | 1/1999 | Gross ...................... G06F 1/163 |
| | | | 361/679.23 |
| 6,899,539 B1 | * | 5/2005 | Stallman ................. F41H 13/00 |
| | | | 345/157 |

(Continued)

FOREIGN PATENT DOCUMENTS

| DE | 102011106170 A1 | 2/2012 | |
| WO | WO-2008060689 A2 | * 5/2008 | ............. F41H 7/005 |

OTHER PUBLICATIONS

ISR; Intellectual Property Office of Singapore; Singapore; May 28, 2021.

*Primary Examiner* — Michael J Zanelli
(74) *Attorney, Agent, or Firm* — Patshegen IP; Moshe Pinchas (57) ABSTRACT

This invention describes a tactical advanced robotic engagement system (ARES) (100) for combat or rescue mission by employing advanced electronics, AI and AR capabilities. In ARES, a user carries a weapon or tool (102) equipped with a hand-operable controller (150) for controlling an associated UGV (170), UAV (180) or UUV. The UGV (170) provides a ground/home station for the UAV (180). The UGV, UAV is equipped with a camera (290) to obtain real-time photographs or videos and to relay them to a heads-up display (HUD) (110) mounted on the user's helmet (104). The HUD (110) system provides intuitive UIs (132) for communication and navigation of the UGV, UAV; AR information reduces visual cognitive and mental loads on the user, thereby enhancing situation awareness and allowing the user to maintain heads-up, eyes-out and hands-on trigger (Continued)

readiness. The HUD (110) also provides intuitive UIs to connect up with peers and/or a Command Centre (190).

9 Claims, 11 Drawing Sheets (52) U.S. Cl.
CPC .......... *G05D 1/0278* (2013.01); *G05D 1/223* (2024.01); *G05D 1/2247* (2024.01)

(58) Field of Classification Search
CPC .... G05D 1/2247; G05D 1/0027; G06F 1/163; G06F 3/011; F41H 1/04; F41H 7/005
See application file for complete search history.

(56) References Cited

U.S. PATENT DOCUMENTS

| | | |
|---|---|---|
| 7,538,724 B1 * | 5/2009 | Baillot .................. G01S 5/0294 |
| | | 342/357.31 |
| 2008/0158256 A1 | 7/2008 | Russel et al. |
| 2010/0017046 A1 * | 1/2010 | Cheung .................. G05D 1/104 |
| | | 701/2 |
| 2011/0106339 A1 | 5/2011 | Phillips et al. |
| 2014/0217242 A1 | 8/2014 | Mren et al. |
| 2015/0261217 A1 | 9/2015 | Gil |
| 2016/0304217 A1 * | 10/2016 | Fisher .................. B64C 39/024 |
| 2020/0272144 A1 * | 8/2020 | Yang ...................... G05D 1/101 |

* cited by examiner

TACTICAL ADVANCED ROBOTIC ENGAGEMENT SYSTEM

RELATED APPLICATIONS

This patent application claims priority to Singapore patent application no. 10202001213X filed on 11 Feb. 2020, the disclosure of which is incorporated in its entirety.

FIELD OF THE INVENTION

The present invention relates to a tactical advanced robotic engagement system (ARES) employing electronic technologies in the field of combat or rescue mission. ARES allows advanced man-machine and augmented reality interactions by providing high-levels of situation awareness and intuitive cognition to achieve mission success; in particular, ARES provides a choice of routes to reach a target area or object of interest, based on an AI rules-based algorithm.

BACKGROUND

Applicant has earlier developed a modular augmented reality eyewear for combat or rescue mission, as disclosed in publication WO2017142480. Applicant now develops an Advanced Robotic Engagement System (ARES) with further enhanced features and processes.

Despite developments in the field of combat or rescue with smart technologies, there exists a need for a new holistic system with enhanced features or processes.

SUMMARY

The following presents a simplified summary to provide a basic understanding of the present invention. This summary is not an extensive overview of the invention, and is not intended to identify key features of the invention. Rather, it is to present some of the inventive concepts of this invention in a generalised form as a prelude to the detailed description that is to follow.

The present invention seeks to provide an advanced robotic engagement system (ARES) employing electronic technologies in the field of combat mission or rescue mission. ARES provides high-levels of situation awareness and intuitive cognition to enable mission success; for eg., ARES provides a choice of routes to reach a target area or object of interest, based on an AI rules-based algorithm, thereby minimising risks and speeding up the process of human decision-making whilst in the field.

In one embodiment, the present invention provides a tactical advanced robotic engagement system (ARES) comprising: a heads-up display (HUD) mounted on a helmet of a user; a weapon or tool having a hand-operable controller mountable on the weapon or tool; and an unmanned ground vehicle (UGV) and an associated unmanned aerial vehicle (UAV) or unmanned underwater vehicle (UUV); wherein the HUD, the hand-operable controller, the UGV and UAV or UUV are in communication links, and the HUD and the hand-operable controller allow operation of the ARES by reducing visual and mental cognitive loads on the user, enhancing the user's situation awareness, enhancing decision making with reduced risks, and allowing the user to maintain mission-critical, time-critical or safety-critical readiness, thereby to achieve task effectiveness and mission success.

Preferably, the hand-operable controller has switch buttons for switching communication links with the UGV, UAV or UUV, a manoeuvre button for pre-set navigational control of the UGV, UAV or UUV and two speed and directional control buttons, with the two speed control buttons being operable simultaneously for hover control of the UAV or UUV. The hand-operable controller further comprises a joystick for directional control and homing of the UAV or UUV to the UGV, where homing allows the UAV to return and dock with the UGV for battery charging. Preferably, the ARES further comprises a dead-reckoning algorithm and an AI algorithm, wherein the dead-reckoning algorithm allows the ARES to track and guide the user when GPS is ineffective in a built-up area, and the AI algorithm allows inputs from various sensors deployed in the UGV, UAV or UUV to recommend execution of a strategy plan with low risks and high effectiveness.

Preferably, the HUD mounted on the helmet has up-down and forward-retract adjustments to allow a better fit to the user according to the user's head and eyes profiles. The HUD also a health and electric power monitor.

Preferably, the UGV, UAV and HUD have sensors that provide positional nodes and their locations on the GPS map. A camera is mounted on the UAV or UGV for taking photos or videos of a target area or object-of-interest. ARES also comprises an AI algorithm built in the UGV or the HUD or the command centre to provide one or more mission routes with minimised risks and to achieve mission success.

In other words, some features or functionalities of ARES include:

1) a weapon associated with a soldier, security personnel or user, with the weapon having a hand-operable controller mountable on the weapon and the soldier/security personnel wearing a heads-up display (HUD) mounted on user's helmet, an unmanned ground vehicle (UGV) and an associated unmanned aerial vehicle (UAV) or UUV;
2) Adjustability of the HUD to suit different individual profile;
3) Control mechanisms of the weapon mountable controller;
4) System of sensor nodes combination (HUD, UGV, UAV, UUV, HQ/Command Centre) for coordination towards the PoI (point of interest);
5) Correcting the various sensors' information via UGV, UAV, UUV and hand-operable controller benchmarked dead-reckoning information when GPS data is lost; and
6) AI (rules-based) powered system to provide recommendations to reduce risks and to improve efficient or effective decision making.

BRIEF DESCRIPTION OF THE DRAWINGS

This invention will be described by way of non-limiting embodiments of the present invention, with reference to the accompanying drawings, in which.

DETAILED DESCRIPTION

One or more specific and alternative embodiments of the present invention will now be described with reference to the attached drawings. It shall be apparent to one skilled in the art, however, that this invention may be practised without such specific details. Some of the details may not be described at length so as not to obscure the present invention.

Figure 1A:
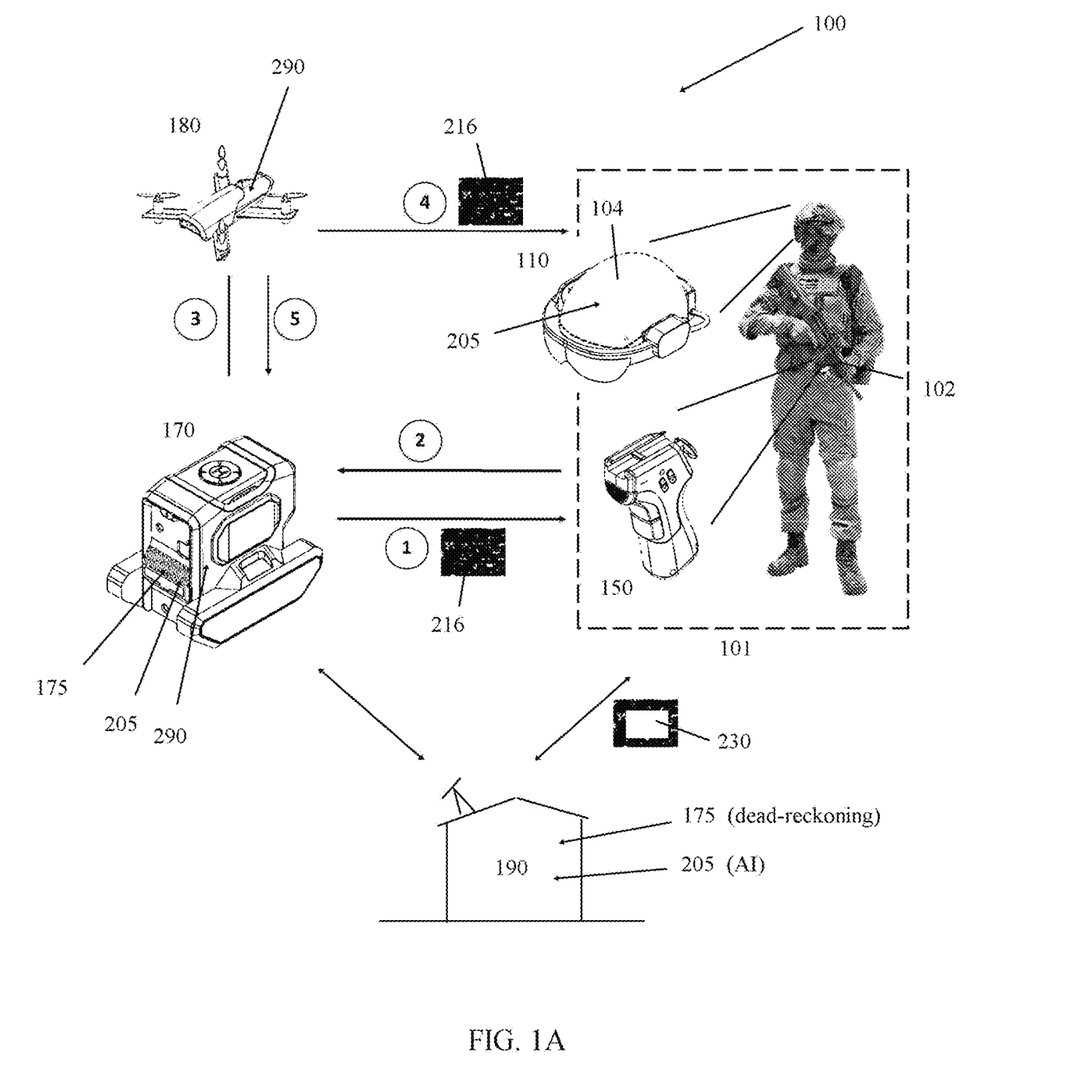
FIG. 1A illustrates an advanced robotics engagement system (ARES) for combat or rescue missions according to an embodiment of the present invention; whilst
Figure 1B:
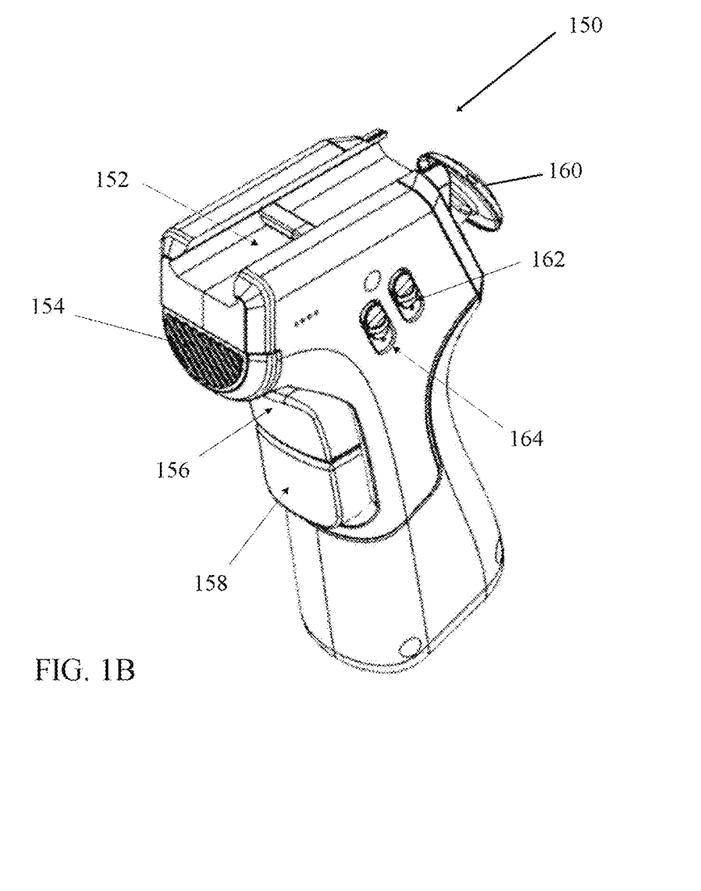
FIGS. 1B and 1C illustrate the hand-operable controller shown in FIG. 1A.
Figure 1C:
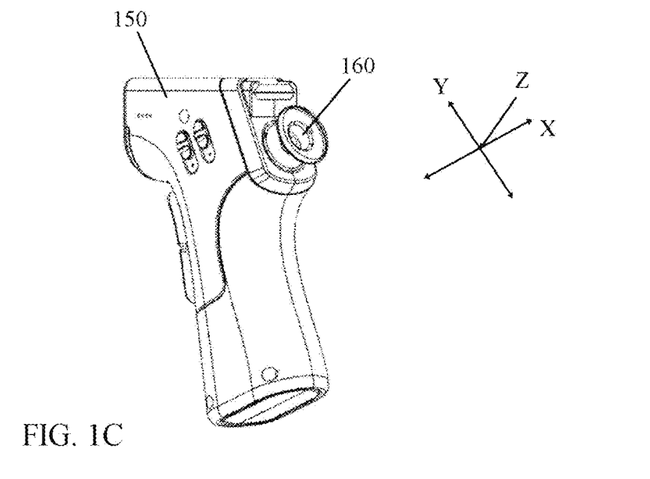
Figure 11:
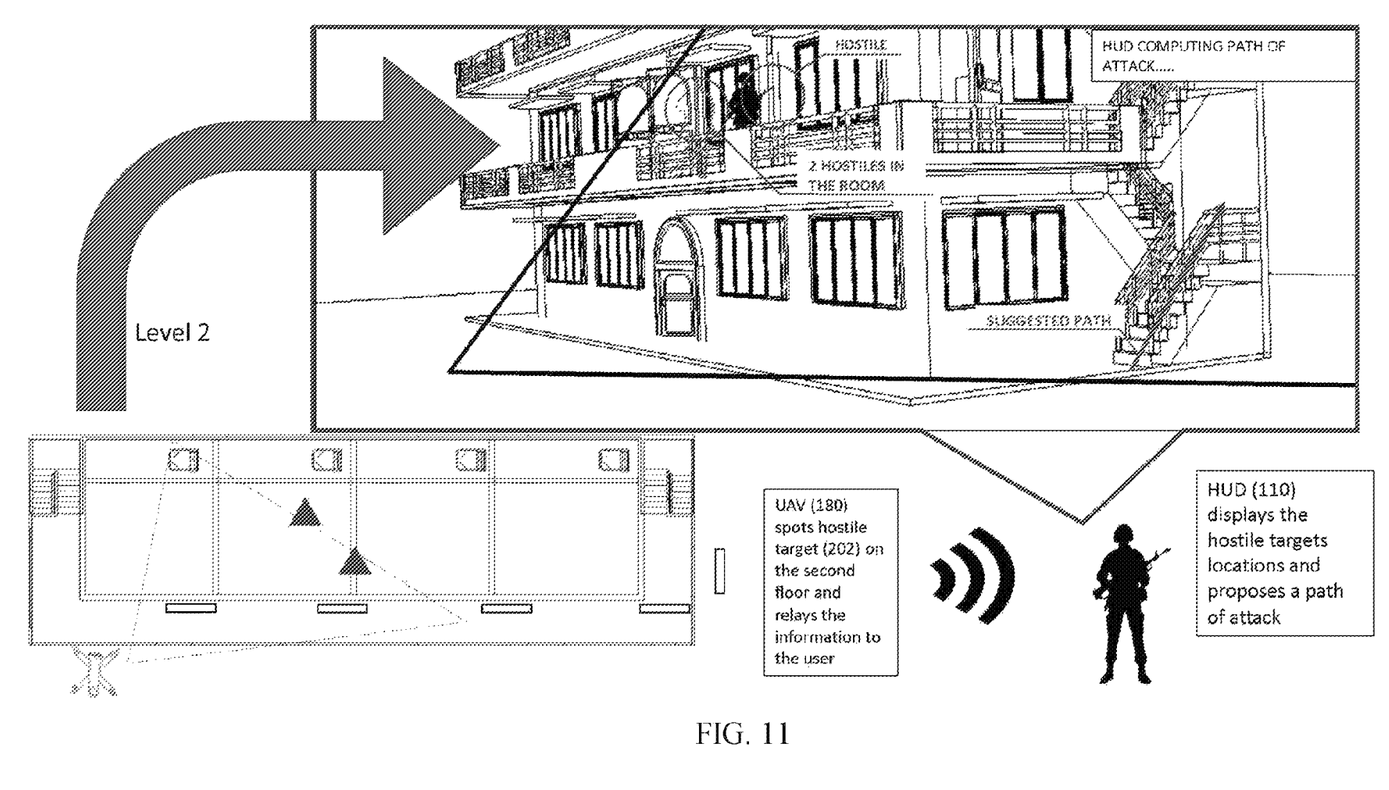
FIG. 11 illustrates the integrated information is used to create a mission strategy map and to suggest a planned route of execution.

FIG. 1A shows an Advanced Robotics Engagement System (ARES) 100 according to an embodiment of the present invention. As shown schematically in FIG. 1A, the ARES 100 includes at least a weapon 102 held by a security personnel or user 101, with a hand-operable controller 150 mounted on the weapon 102, where the hand-operable controller 150 is in communication with an unmanned ground vehicle (UGV) 170, which UGV 170 communicates with one or more associated unmanned aerial vehicles (UAV) 180 or drones. The security personnel or user 101 is equipped with a helmet 104 complete with an augmented reality (AR) protective eyewear (or heads-up display, HUD 110), which HUD 110 has communication down-links from the UGV 170 and UAV 180. The UGV 170 also serves as a home and docking station for the UAV 180, for eg., for battery recharge. The hand-operable controller 150 is, preferably, mountable on a Picatinny rail 152 located on the weapon 102; the hand-operable controller 150 can also be hand-held and operable in the hand of the user 101. The hand-operable controller 150 has buttons 162,164 for which the personnel/user can select modes for communication with the UGV or UAV, a joystick 160 for navigating or homing the UGV or UAV, and a button 154 programmed to execute predefined navigation of the UGV or UAV. Additional buttons 156,158 are provided for controlling speed, directions and hover of the UAV 180. The hand-operable controller 150 may also include 3D-sensors 166 whose outputs vary with direction of tilts for controlling directions and speeds of the UAV 180. Some of the buttons 154,156,158, 162,164 and the joystick 160 on the hand-operable controller 150 are shown in FIGS. 1B and 1C. With ARES, the UAVs 180 are deployed to take videos or photographs of a target area 202 (field or confined environment/built-up) or OoI (object of interest) 204, for pre-mission or during a mission operation; these videos or photographs are stitched together (for eg., with a graphics stitching module 280), thereby allowing the target area 202 to be mapped and OoI 204 to be located; ARES 100 thus provides an unmanned system for information or intelligence gathering to provide real-time or substantially real-time situational reconnaissance; with information/intelligence gathered, the personnel/user 101 becomes aware of obstacles or danger/enemy positions and is enabled to assess real-time situations, for eg., in a combat or rescue mission. With high-levels of situation awareness and substantially real-time information, ARES 100 ensures safety of personnel deployed and minimises possible collateral damage to equipment. The substantially real-time information is processed with an algorithm or AI rules-based algorithm 205 to provide planned or suggested routes for the user to reach the target area 202 or OoI 204 in a more effective or efficient and safe manner, as illustrated in FIG. 11. Such situation awareness also allows mission plans to be reviewed, adjusted or updated as situations play up.

Figure 2:
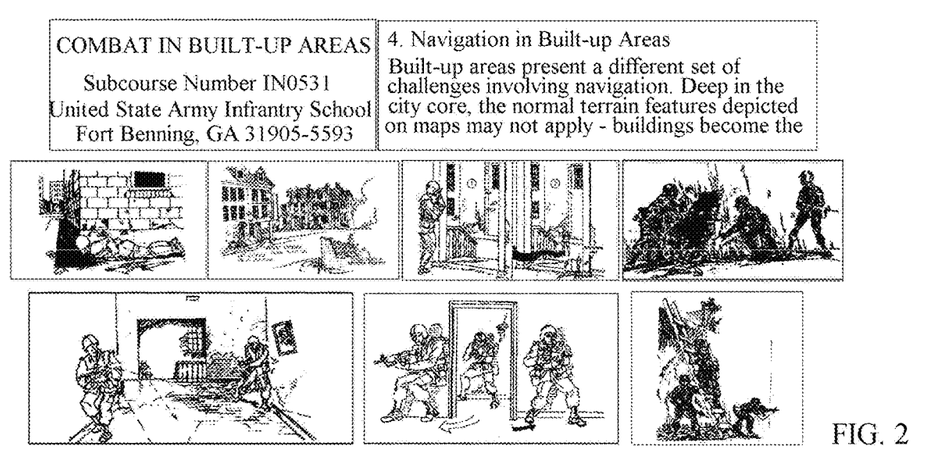
FIG. 2 illustrates challenges of navigating in a built-up area.

Navigation in built-up or urban areas: built-up areas present a different set of challenges involving navigation. In the city core, normal terrain features depicted on maps may not apply—buildings become the major terrain features and combat/rescue units become tied to streets. Fighting in the city destroys buildings whose rubble blocks streets. Street and road signs are often destroyed during fighting. Operations in subways and sewers present other unique challenges. However, maps, photographs and videos made available by augmented reality (AR) and transmitted from the UAV 180 and UGV 170 to the HUD 110 help the combat/rescue units overcome these problems. Global positioning system maps 216 associated with AR also provide navigation abilities in built-up areas. FIG. 2 shows pictures of built-up areas a user may encounter.

In one embodiment, a dead-reckoning module 175 is provided in the UGV 170, UAV 180 or HUD 110, with the UGV, UAV and HUD providing nodes for navigation. For eg., when GPS data is lost in a built-up area, the dead-reckoning module 175 patches from the last GPS data and continues with estimations of distances and heights traversed. With the dead-reckoning module 175, mapping of the surrounding is continuous and this is provided to the HUD 110 and user 101 without leaving gaps in situational awareness.

Also, with the dead-reckoning modules 175, the UGV 170, UAV 180 and hand-operable controller 150 are constantly paired, and their relative distances and positions are constantly benchmarked to the last GPS information when GPS is lost. The UGV 170, UAV 180 and hand-operable sensors 166 node information is also used to correct the position coordinates to ensure accuracy of the target area/OoI mapping.

The wearable HUD 110 includes a near-eye display or projection member 112, which displays an image 133 that is visible to the user 101 at an oblique angle whilst the user sees real objects straight through the eye-pieces. The HUD 110 system is useful for mission-critical, time-critical or safety-critical situations in which the user 101 is provided with or interact with intuitive augmented reality (AR) information about the surrounding (ie. situation awareness) so as to allow the user to make quick and accurate decisions. Such AR information is transmitted via intuitive user interfaces (UIs) 132, which help to minimise visual cognitive loads when making quick decisions, for sending/receiving information, and communicating amongst users 101 in the field, between users and their equipment and/or between the user and a Command Centre 190. This HUD 110 system is also useful for mission-critical, time-critical or safety-critical tasks because users are constantly on the look-out and stay vigilant whilst AR information is made available at an angle to the line of sight, and the user's hands are always ready on their equipment for action (in so-called heads-up, eyes-out and hands-on trigger postures).

Figure 1D:
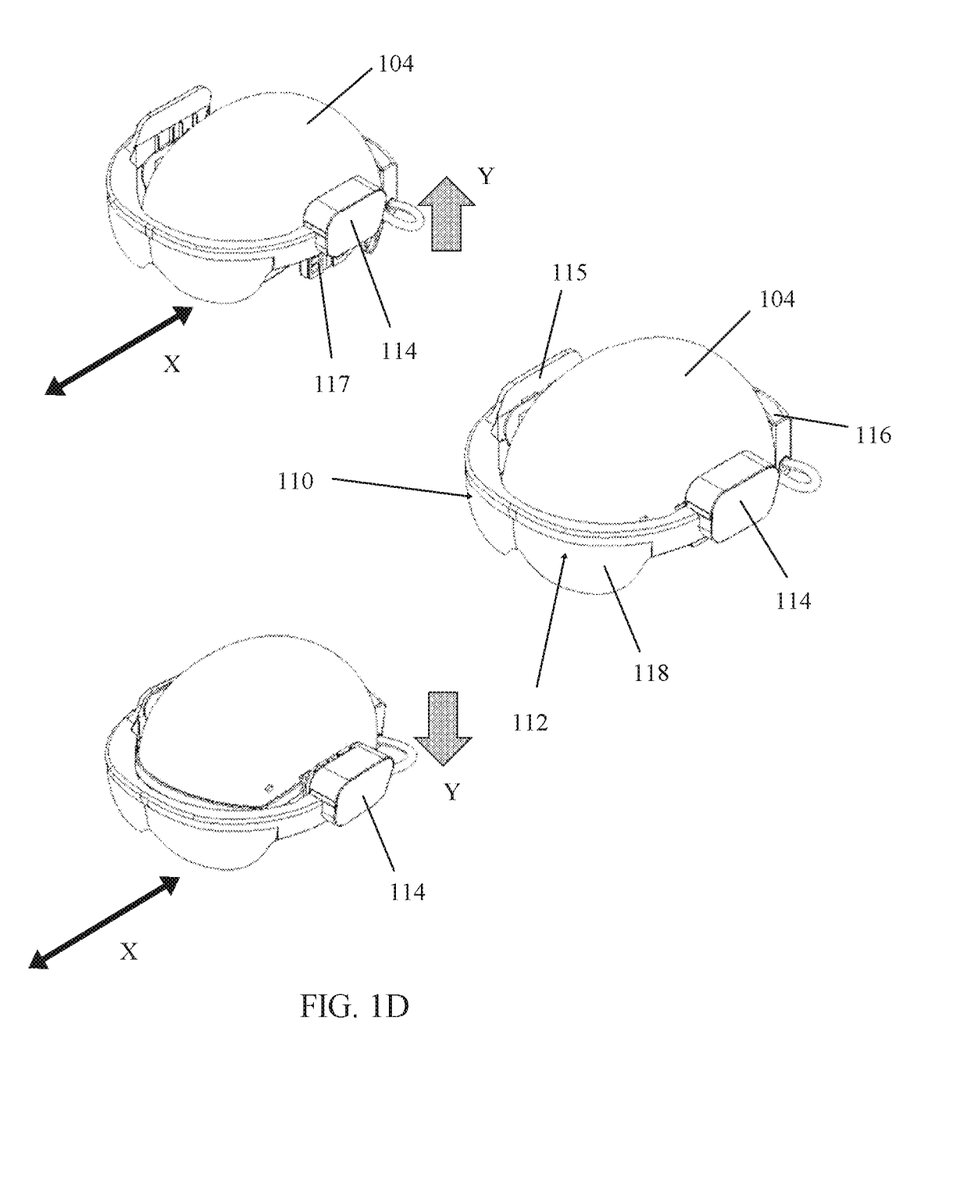
FIG. 1D illustrates adjustability of the HUD on the helmet shown in FIG. 1A.

The HUD 110 mountable on the helmet 104 of a user includes a processor module 114, a battery module 115, a trunking module 116, an adjustment module 117 and a protective visor 118. The adjustment module 117 adapts to the Picatinny rails located on the helmet 104 and allows two axes of movements, a horizontal X and a vertical Y degree of adjustment according to comfort of the user's head and eyes profiles; these freedoms of adjustments are shown in FIG. 1D. The processor module 114 includes an electronic processing unit, a wireless communication unit, a barometer, a pedometer, a nine-axis inertia measuring unit (IMU), a GPS unit, a touch pad and some select buttons (which are described in publication WO2017142480). On the processor module is a drop-in slot connector, which allows pivotable connection with the display or projection module 112. The projection module 112 includes a body member and a transparent prism member. The body member houses a micro-display unit, a camera/video unit, a light sensor and a thermal camera. In low light conditions, the camera unit and the thermal camera are both activated, and an image fusion algorithm corrects the outputs of both the camera unit and thermal camera, and provides thermal images with defined outlines to assist the user with night vision; with these thermal images, the user can better identify targets 202 or objects of interest (OoI) 204; this night vision function can be activated by toggling on a night vision button 138 on the UI 132. In addition, some buttons (such as, on/off or select buttons) are provided on an upper face of the body member. The transparent prism member has an internal reflection surface on which an image projected from the micro-display unit is formed and is visible to the user by side glancing. In use, the HUD 110 system is wirelessly connectable, at least, with the UGV 170 and UAV 180 or with third-party support devices, such as, a laser finder, an acoustic targeting system (ATS) and other forward equipment (such as, an unmanned underwater vehicle (UUV). In another embodiment, the barometer, pedometer, IMU, and so on, may be housed in a separate unit, which is wearable on the user's uniform or vest so that when a user enters a building, GPS is no longer available and outputs of these sensors can continue to provide navigation support. In other embodiments, the touch pad can be configured as a tactile track point.

The HUD 110 also includes user interfaces UI 132 that allow AR information to be provided to the user intuitively (ie. enables heads-up readiness). In other words, during mission-critical, time-critical or safety-critical moments, AR information about the surrounding is provided to the user and/or users/peers 101 to allow them to make critical decisions quickly and accurately whilst the user(s) is/are in the frontline (ie. with eyes-out and hands-on trigger/equipment postures). The electronic components in the processor module 114 respond equally quickly and automatically to support these mission-critical, time-critical or safety-critical moments. When the user is in a less pressing moment that the user is able to use the touch pad/track point and select buttons to input data, such as, using the laser finder, taking photos/videos with the camera/video unit, tagging objects of interest (OoI) on the photos, navigating the GPS map, sending information to other users/peers and to the Command Centre 190, and so on. These intuitive user interfaces 132 help to minimise cognitive load on the user so that they can concentrate on mission-critical, time-critical or safety-critical decision making. Thus, with the HUD 110 and the ARES 100, user decision making process and task effectiveness and efficiency are enhanced.

Figures 3A, 3B:
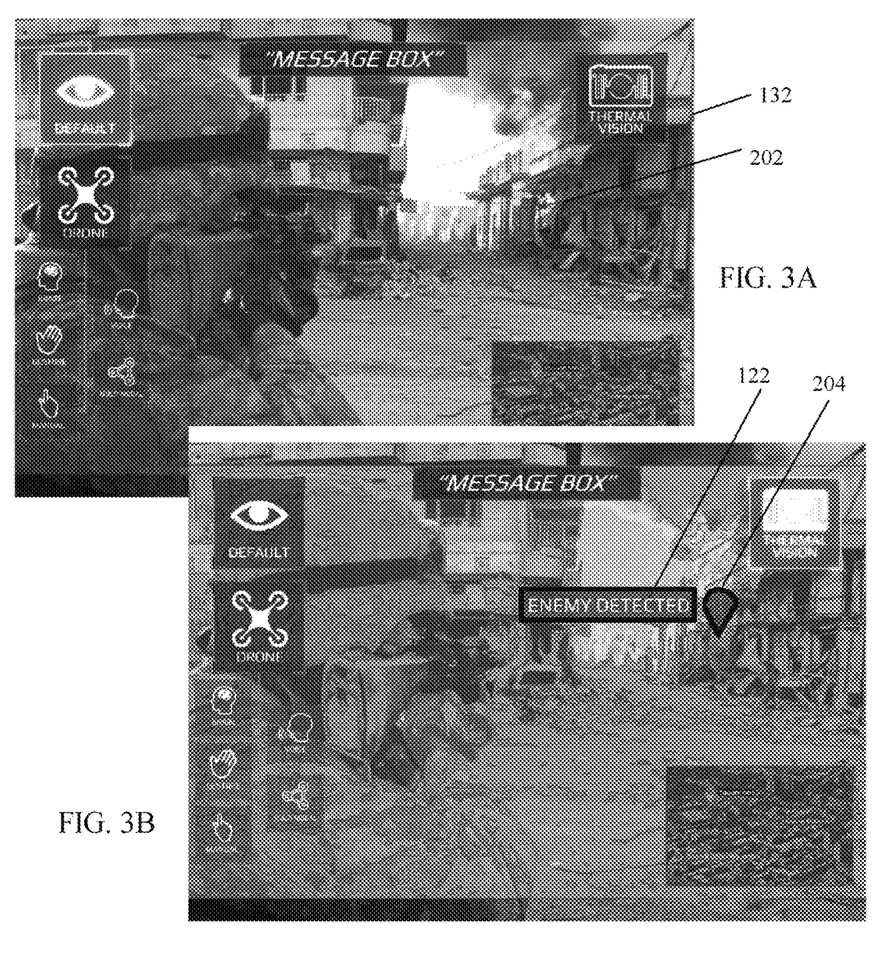
FIGS. 3A-3B illustrate tagging and man-identification functionalities built in the heads-up display (HUD) shown in FIG. 1.
Figure 6:
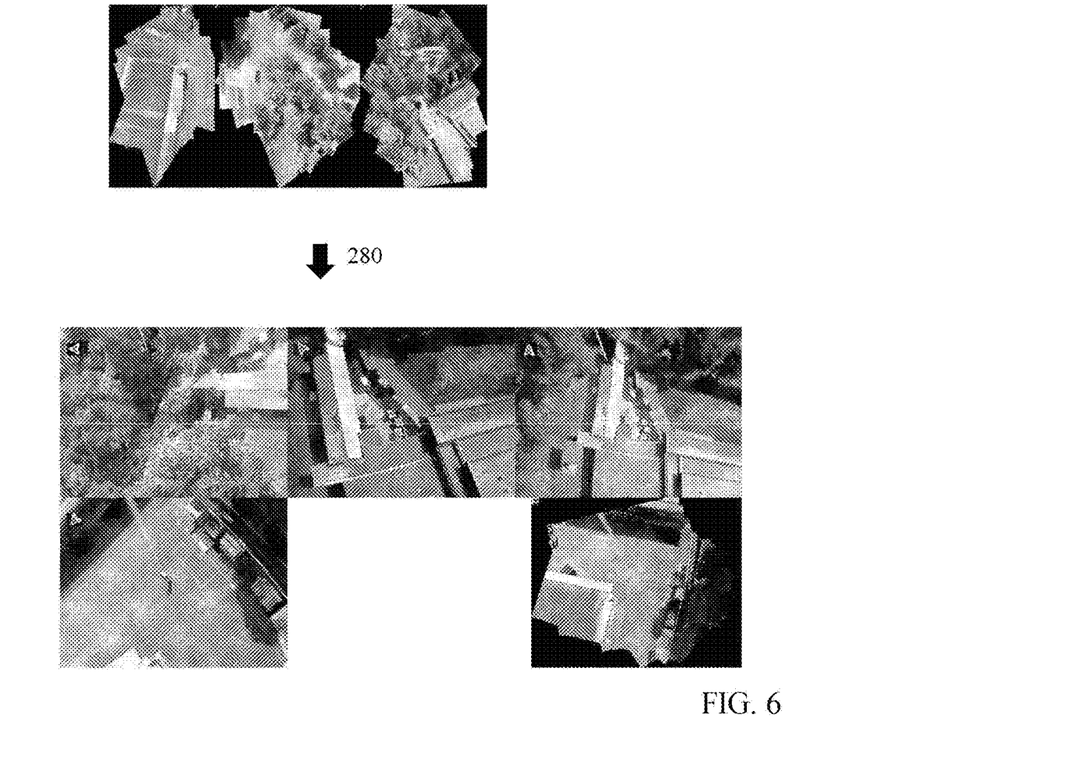
FIG. 6 illustrates stitching of photographs or videos captured by the UAV and making target mapping available in the HUD.
Figure 7:
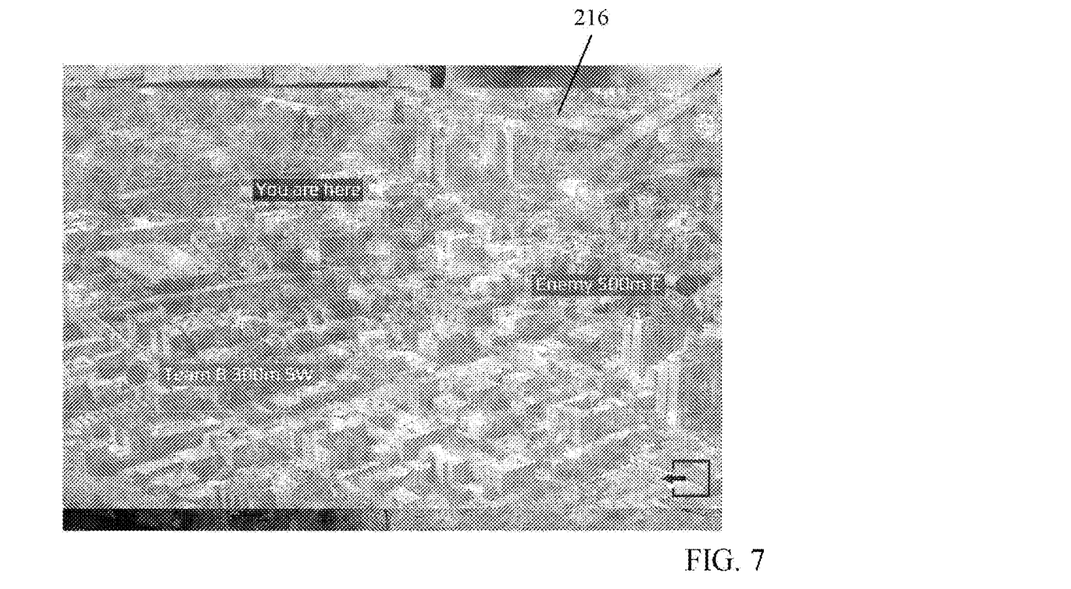
FIG. 7 illustrates a GPS map obtained after stitching of photographs or videos with tags to identify objects-of-interest and target area.
Figure 10:
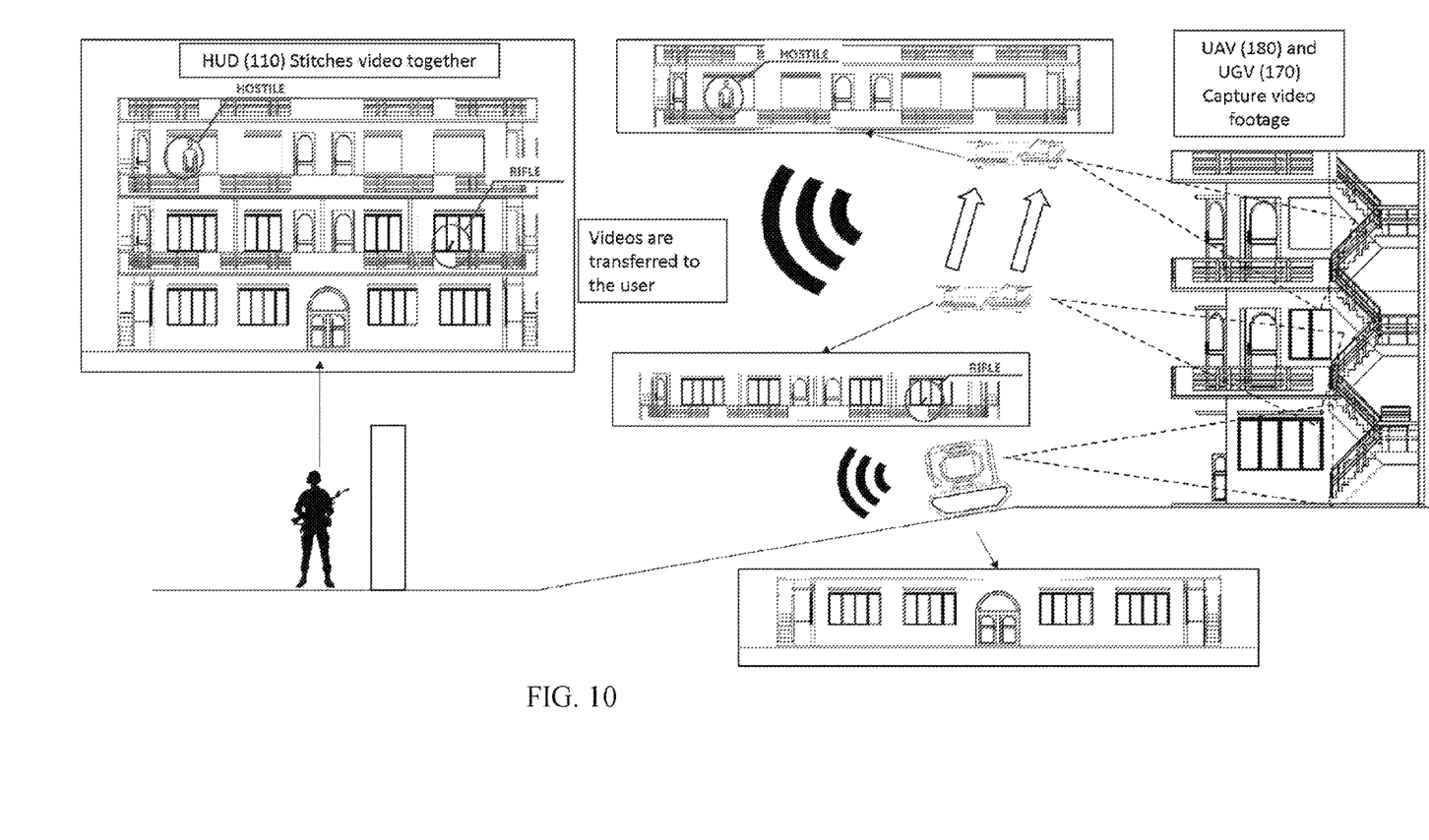
FIG. 10 illustrates photos or videos from the UAV and UGV being stitched together from to provide integrated information to assist user make decisions.

The above HUD 110 provides a multimodal control 140 and various view modes 200 of user interfaces. A default AR view mode or UI 132 allows the user to see-through the projection module 112 for identifying OoI 204 (ie. reality view) and be provided with AR information. With the camera set in video taking as the default mode, video is presented near the centre of the AR view 132 where a man-identification algorithm in the electronic processing unit 114 is provided to identify and to mark or highlight a human face in the video. Automatic marking of a human face in the frontline vision helps to locate a target or to warn the user of a potential threat. The human feature identified in the video can also be tagged, for eg., with an icon and may be additionally distinguished as a friend/peer or foe. The tagging functionality may be supported by a humanoid recognition and tagging algorithm 122 located inside the processor unit 114. The humanoid identification and tagging functionality is illustrated with FIGS. 3A-3B. At the same time, a bottom right side of the AR view is a minimised GPS map 216 view of the surrounding. The position of the human feature or any OoI 204 can be planted on the GPS map 216 by firing a laser finder at the target and obtaining estimates of distance and location coordinates with respect from the user position. Preferably, the minimized GPS map view occupies about 25% of the entire AR view. On the left-hand edge of the AR view, there are 4 control mode buttons/icons, namely, a default control 136, a drone control 139 linked to a multimodal control 140 and manual control 145 buttons. On the right-hand side, a thermal night-vision control 138 is provided. The manual control button 145 may provide for activating the camera/video unit, interfacing with third-party support devices, activating an emergency hotkey to communicate with the Command Centre 190 and logging out of the AR mode. Across the top of the default AR video view is a message box or panel 137 that pops up an incoming message from other user/peer 101 or the Command Centre 190 to the user. Additionally or alternatively, the UAV 180 is operable to take real-time photographs or videos of the surrounding and OoIs embedded with GPS information, and provides substantially real-time information to the user via the HUD 110 system. These photographs and videos with GPS information can then be pieced/stitched 280 together by a graphics processor (GPU) and the graphics stitching module or algorithm 280 located in the HUD processor module 114, thus reducing visual cognition load on the user. FIG. 6 shows a map being made of photographs that are stitched 280 together, whilst FIG. 7 shows a GPS map 216 when viewed through the HUD 110 system. FIG. 10 also shows a manner of receiving GPS maps from the UGV and UAV and stitching the maps to create a mission strategy map.

When a user wears a vest equipped with a health and battery power monitor 119, health conditions of the user (such as, body temperature, health state (such as, tired, exhausted, danger of heat stroke, etc.) and electric power level may be displayed in a health and supplies UI panel, for eg., inside the default control 136. Preferably, when the above view mode buttons/icons are activated, the selected view colour toggles, for eg. to grey, green, or so on.

In the default AR control 136, the camera can be activated to take video or photo by activating the camera icon or button. With a photo taken, the user can activate the touch pad/track point, move a highlight box to select a target 202 or OoI 204, click within the highlight box to attach a tag or icon. Alternatively, the entire photo can be tagged. If the user takes no action after capturing a photo, the view mode reverts to the default AR video mode after a lapse of a predetermined time, such as about 10s; alternatively, when the user does not need to tag a target or OoI, the user can click on a cancel button on the touch pad to switch immediately to the default AR video mode UI 132. If the touch pad is still active, the predetermined view mode toggling will not take place and the user can continue tagging other targets or OoIs. The predetermined view mode toggle will occur when the AR display system detects inactivity from the user. The videos, photos and tagged photos are sent to the UGV 170, peers 101 and/or the Command Centre 190 for recording and analysing.

In dim light situation or night time, the user 101 can activate the camera and thermal camera for assisted night vision. As in the default video view mode, the man-identification algorithm automatically helps to identify and to mark/highlight a human face in the field of vision to lessen visual cognitive load on the user. The thermal camera equipped with an IR sensor also helps to locate enemy positions from IR signatures.

When the UGV 170, UAV 180 or forward equipment (such as, UUV) or K-9 101a are deployed in the frontline ahead of the user 101, the drone control 139 view shows a turret icon. When the turret view icon is activated, the UGV, UAV and forward equipment are automatically paired with the HUD 110 system. When pairing is not successful, the user has the option to reconnect the pairing; if the pairing fails, the user 101 or Command Centre 190 is notified. In the drone control 139 view, a sighting cross-hair appears in the centre of the video streamed from the UGV, UAV or forward equipment (or camera/detector). Pan and tilt movements of the UGV, UAV or forward equipment's turret directions are controlled by outputs of the 9-axis IMU by moving the head of the user in real-time (ie. requiring substantially continuous, manual inputs to actuators and sensors in the forward equipment) or the 3D sensors 166 located in the hand-operable controller 150. Alternatively, brain sensory control 141, gesture control 142, and/or voice control 143 (integrated with the multimodal control 140 may be used to control movements of the UGV, UAV or forward equipment in an autonomous mode, thereby allowing heads-up, eyes-out and hands-on readiness. The hand-operable controller 150 (hand-held or mounted on the user weapon/tool 102) in association with control of the UGV 170 and the UAV 180 are illustrated in FIG. 1A.

Figure 5:
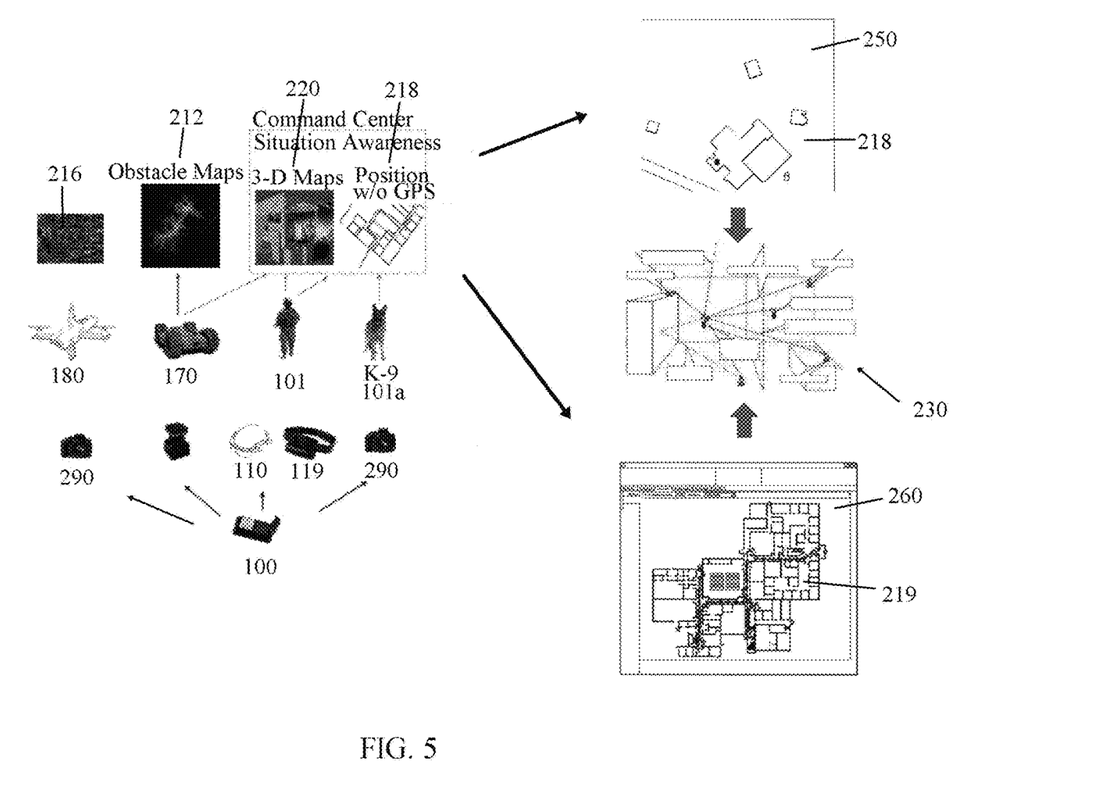
FIG. 5 illustrates use of various sensors providing nodes information and combining the nodes information to provide a strategy plan to achieve effective mission success.

Clicking on the mimimised GPS map 216 brings up the full GPS map view in an outdoor navigation tracking view 250, as seen in FIG. 5; in the outdoor navigation tracking view 250 shown in FIG. 5, a position map 218 without GPS information is shown. In the GPS map view, the user is identified by a circle with an apex of a triangle indicating the direction the user is facing as enabled by the GPS unit and 9-axis IMU. For eg., peers or friends are identified by water-drop location pin, whilst foes are identified by quadrilateral speech location pin. On the edge of the GPS map view are 4 buttons, respectively for returning to the default view mode, for zooming in, zooming out and refreshing the GPS map. A user can tap on the peer location pin to send a message (text, icon, photo or video). On tapping a peer location, a keypad pops up for the user to enter and send a message. Refreshing updates location of the tagged, peer/friends and foes locations from the last viewing position (instead of refreshing from the user's location).

Figure 9:
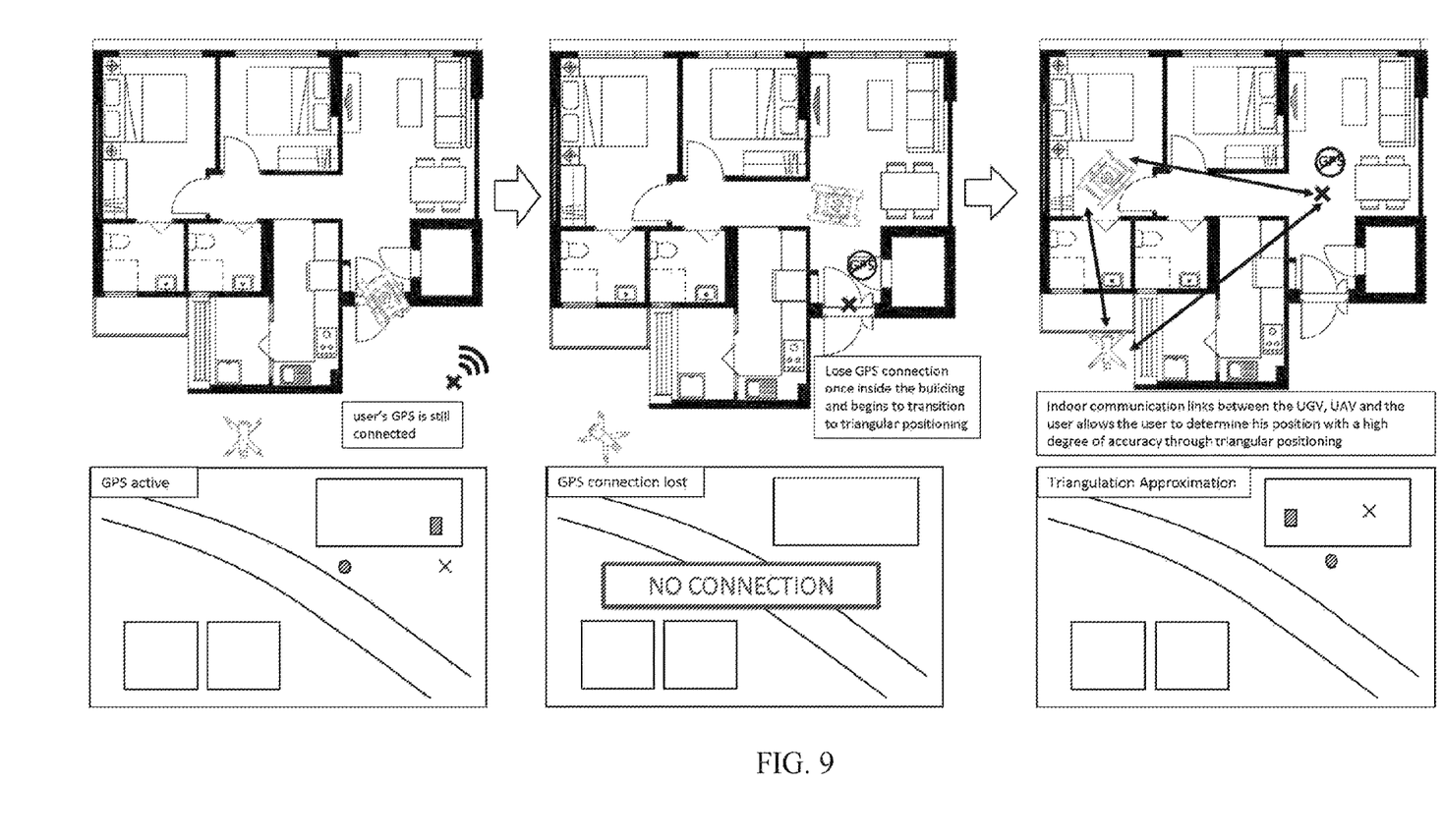
FIG. 9 illustrates GPS information being reckoned.

When a user enters an indoor area, GPS communication is lost and the user is directed to an indoor navigation tracking view 260, as seen in FIG. 5. From the last known GPS coordinates and direction, the pedometer provides the user with the distances moved, even with rates of movements, whilst the 9-axis IMU provides the directional changes and the barometer provides the ascending or descending distances. FIG. 5 shows the indoor navigation tracking view 260 with an indoor map 219 for illustration. FIG. 9 also shows the manner of determining user position after GPS information is lost when indoor.

Third-party support device view mode: The third-party support device may be a laser finder or an ATS. With the use of the ATS, a clock face visually shows positions of the targets or OoIs, with concentric circles indicating distances from the user and an apex of a triangle at the centre shows the direction the user is facing. The user has the option to tag a target location within the predetermined view mode toggle time. These known target locations and tags are automatically planted on the GPS map 216 and are made available to other users/peers 101 and the Command Centre 190.

Preferably, after tagging a target or OoI position, the HUD 110 system automatically switches to the photo taking view mode. The AR display system switches over to the default AR view 132 after a predetermined time has lapsed or the user has the option to cancel the photo taking view mode to immediately switch to the default AR view mode.

Emergency view mode of the user interface for communicating with other users/peers 101 or the Command Centre 190: In the emergency view mode located inside the default control 136, text and/or icons are selected from a keypad to compose messages in an input view panel. The message is sent by activating a send button. In addition, the camera can be activated to provide live video of the frontline surrounding. In the situation when the user requires assistance or attention, the camera can also be programmed to provide live video stream to other users/peers 101 or the Command Centre 190.

Communication with other users/peers, with the drone (UGV, UAV, UUV) or K9, with the third-party support devices or with the Command Centre 190 may be via secure wireless connection. As described above, the message box or panel 137 pops up at the top of the default AR video view 133. A tick button near the incoming message panel for the user to acknowledge receipt; if no acknowledgement is made, the message box 137 fades away after a predetermined time lapse, such as, about 15 s. The message box 137 disappears immediately after acknowledging receipt. To send a message to a peer/friend, the user 101 clicks on the GPS map 216 and clicks on the relevant position icon representing the peer/friend and the message box 137 appears.

Now, the HUD 110 system is described to bring out more clearly each of the various functionalities: (1): Feeding of intuitive AR information to users to help improve situation awareness and to enable quick decision-making. The user interfaces help in minimizing visual cognitive load or information overload on the users so as to lessen the burden on the users 101 in making decision by providing AR information in an intuitive manner and lessening visual and mental demand on them to capture and send information at the frontline to other users/peers 101 or Command Centre 190. In addition, various view modes in the user interface allow the users to quickly switch to the various functionalities, such as:

(a) Default AR view 136—allows users to see through the projection module 112 in the heads-up and eyes-out concepts with constant view of the real surrounding and staying vigilant, and hands-on trigger readiness for action whilst receiving AR information for decision making;
(b) Night vision button 138—allows users to use the HUD in dim light environment;
(c) drone control 139—UGV, UAV, UUV and forward equipment interaction (such as, K9) with man-identification algorithm for identifying humans in videos of forward (or frontline) surroundings, which are some distances away from the users;
(d) Tagging 122 of humans identified as peers/friends or foes in videos of frontline surrounding;
(e) GPS map 216 view—allows users to appraise frontline surrounding by using location maps through GPS and to help in user navigation, communication with peers/friends and review of mission plan;
(f) Interface with third party support devices (such as, ATS and laser finders) to trace and to locate hostile or target locations on the GPS map;
(g) messaging interface 137—allows users to communicate and coordinate with other users/peers in the frontline and with the Command Centre 190; and
(h) Emergency hotkey—for contacting or alerting other users or the Command Centre 190 during an emergency.

Figure 8:
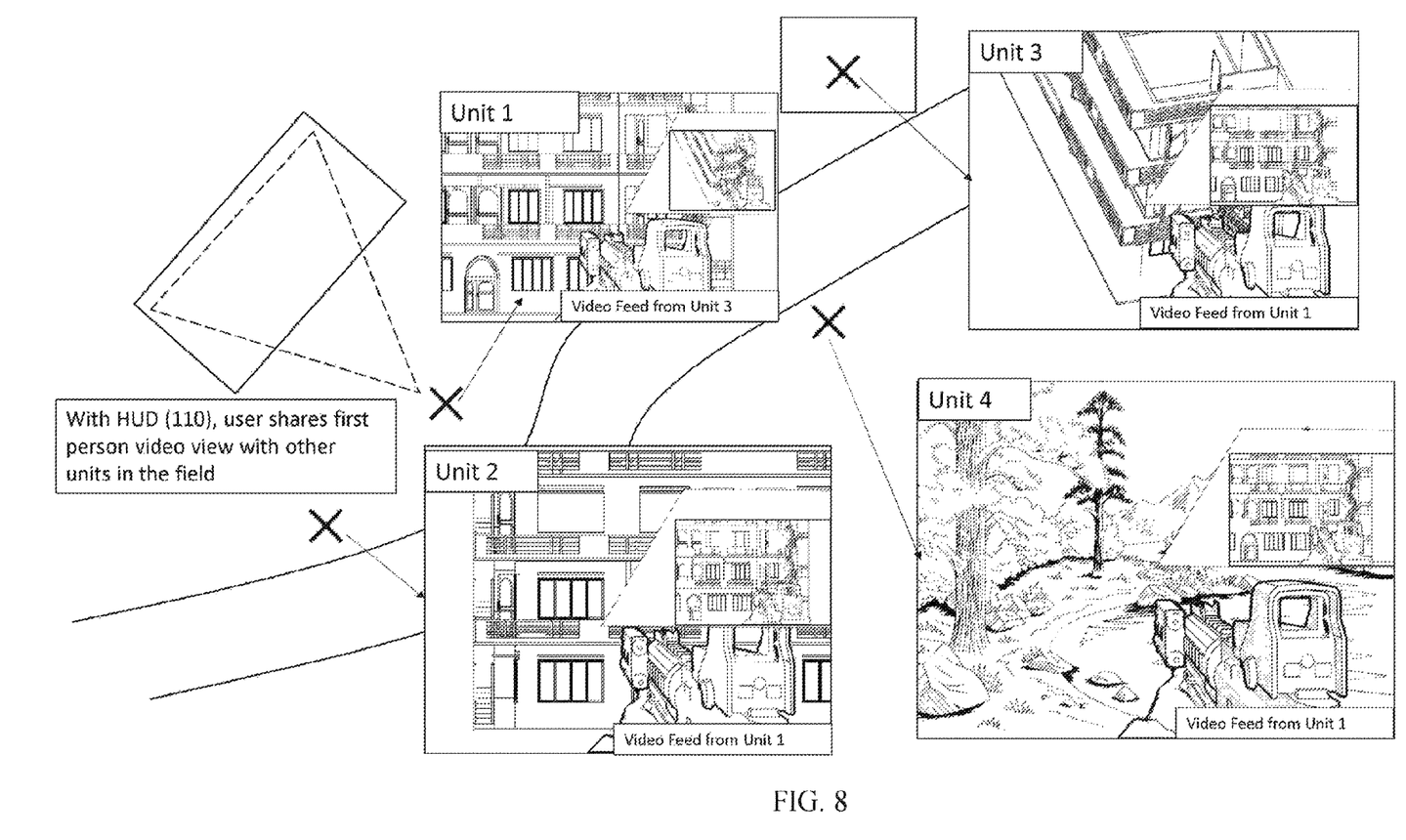
FIG. 8 illustrates photos or videos being shared between users in the field.

(2) Identification for danger sensing (in the default AR video view 136):
(a) the man-identification algorithm, automatically detects and identifies a human face from the video of the frontline surrounding and marks/highlights 122 the detected human whether they are friends/peers or foes (targets);
(b) from this video view mode, users can activate the camera/video button to take photos or videos of the frontline environment to assist other users 101 or to send to the Command Centre 190;
(c) users can activate third-party support devices (such as, a laser finder to fire at target positions for automatic planting of target locations/coordinates onto the GPS map 216 so that AR information can be shared with other users or the Command Centre 190 (as illustrated in FIG. 8); and
(d) turns on the night vision mode 138 when the surrounding is dim.

(3) GPS map view 216 mode allows:
(a) automatic identification of locations of user and peers/friends in the frontline. This visual broad view of the frontline surrounding lessens visual cognitive load on the users; and
(b) targets/foes 202,204 locations identified through third-party support devices are also automatically planted on the GPS map 216, thus helping the user to navigate in the field and to communicate with other users/peers or with the Command Centre 190.

(4) Digital tagging 122 of OoI for identification and tracking:
(a) tagging allows digitally labeling of targets onto videos or photos captured with the camera/video function;
(b) tagged information can be in the form of text message or represented by icons or logos;
(c) tagged information is reflected in the GPS maps 216 for sharing with other users (as seen in FIG. 8) or the Command Centre 190; and
(d) instructions and messages from the Command Centre 190 are received and read by each user in the message panel 137 that is prominently shown across the top of the AR view.

(5) Forward equipment interaction:
(a) the forward equipment includes camera/video 290 mounted on or sensors/detectors built in the UGV, UAV, UUV or K9 which are deployed ahead of the user 101; FIG. 5 shows a map of sensors/detectors providing nodes information;
(b) with outputs from the 9-axis IMU, users can control navigation of the UGV, UAV or UUV for eg., by real-time panning and tilting of the 3D sensors 166; or using the hand-operable controller 150 (hand-held or mounted on user's weapon) for manual navigation control of the UGV, UAV or UUV;
(c) the camera provides live video streams of the frontline surrounding to assist other users or sending to the Command Centre 190; and
(d) planting and activating remote sensors or detectors (even with camera 290 mounted on K-9) to assist in user navigation.

(6) Interface with third-party support devices to trace/locate and identify hostile or targets:
(a) the clock face display provides visual information, such as, the angle, range and position of friends/peers and foes/targets at the frontline. Positions of foes can be traced from detecting hostile gun-fires using third-party devices like the ATS; and
(b) with the help of laser finders, users 101 can locate foes/targets coordinates and these locations are planted onto the GPS maps 216.

(7) Communication and coordination with the Command Centre: Users at the frontline may not have a complete view of the surrounding, for eg. due to nature of terrain and structural obstructions, thereby needing support from the Command Centre, in the form of non-verbal and non-line of sight information of strategic place-of-interest (PoI) 202 or certain OoIs 204:
(a) The Command Centre 190 receives information from other users 101 at the frontline and can thus stitch photographs or assembly videos together before disseminating information (such as, messages (text or icons) or AR photos/videos to users for better coordination;
(b) users 101 are also able to send messages (text or icons) and photos/videos to the Command Centre 190 and other users 101 for sharing information and communicating with one another, for eg. as illustrated in FIG. 8;
(c) information history is tracked by time stamping as frontline situations are fast changing; and
(d) the hotkey for emergency contact with the Command Centre 190 is provided as a button at an edge of the default AR view UI 132. The hotkey allows users to seek quick assistance and attention from other users or the Command Centre 190.

(8) User health and battery power monitor 119. When the user wears a vest with health monitoring, the user is made aware of the state of health (such as body temperature) and be warned of any unhealthy symptoms via the health and battery power panel; when the vest is also equipped with battery power sensing, the user can check the battery power level, even before setting out on a task or mission. This functionality may help to minimise mission failure in the field.

In the following description, the hand-operable controller 150 is now described for manual navigation of the associated UGV, UAV or UUV, which is deployed as a forward equipment in the frontline. The hand-operable controller 150 has several buttons 154,156,158 and a joystick 160. The buttons 162,164 are configured to select the UGV, UAV or UUV, whilst the joystick 160 is to navigate the UGV, UAV, UUV or to home a UAV to the associated UGV. Other buttons can also be provided to activate the camera 290 mounted on the UGV, UAV, UUV to take photographs or videos and transmit AR photos and videos to the HUD. 3D-sensors 166 located in the hand-operable controller 150 tilts according to orientations and output signals are operable to control speeds of the UGV, UAV, UUV (depending on UGV, UAV, UUV mode selection). In the present invention, the users 101 are often called to execute mission-critical, time-critical or safety-critical tasks; the hand-operable controller 150 thus allows a user quick control of the associated UGV, UAV, UUV, yet allowing the user to stay vigilant with heads-up, eyes-out and hands-on trigger readiness (with the UGV, UAV, UUV not requiring both hands to operate); at the same time, with AR information being presented to the user or made available to the user, the HUD 110 system and the entire ARES 100 enhance the user's task effectiveness and efficiency. In addition, the hand-operable controller 150 adapts to the user (instead of the user having to adapt to the controller, as is the case for the conventional drone controller).

Figure 4A:
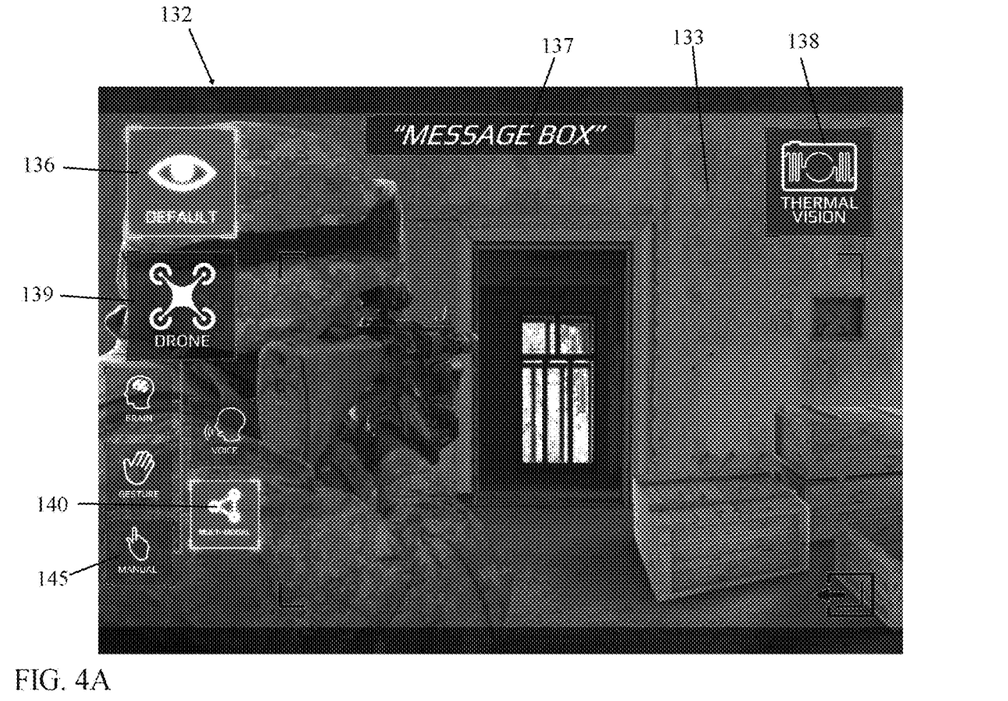
FIGS. 4A-4B illustrate a multi-modal user interface in the HUD with output signals to the hand-operated controller for operator control of the UGV and UAV, with FIG. 4B showing a view from the UAV.
Figure 4B:
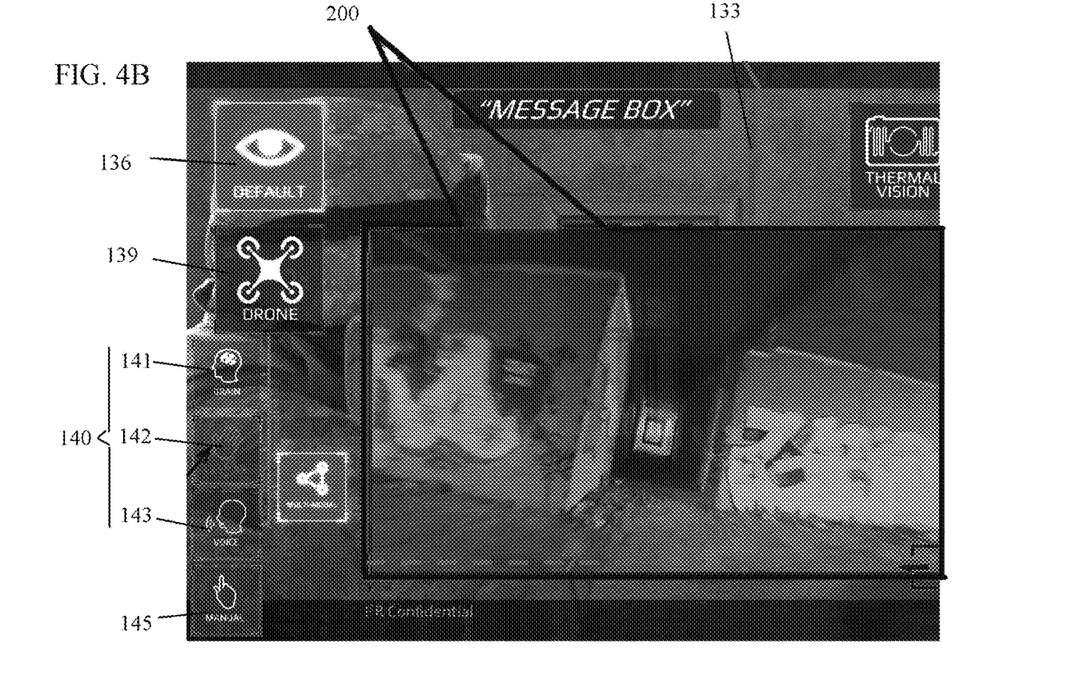

As described above, the HUD 110 system being provided with multi-modal control mode 140, namely, brain signals 141, gesture 142, voice 143 and manual 145 input, which are inputted to a command integration unit. FIGS. 4A-4B show the default UI 132 including the multi-modal control 140. For eg., in response to the command integration unit, the UAV 180 executes an autonomous command signal and incrementally updates its state; for eg., by executing a predetermined distance in a predefined direction in steps from a present position. In another eg., by executing an "up" autonomous command signal, the UAV moves up a predetermined altitude in steps from its present position. With this autonomous control, during a critical moment, a user can continue to hold the weapon or tool 102 with both hands, with eyes-out and staying vigilant whilst navigating the UAV, UGV, UUV. This autonomous control with predetermined motion and direction is distinguished from the real-time control provided by outputs from the IMU. Further, the user 101 has a choice of initiating a voice control 143 (where a certain degree of sound is acceptable), gesture control 142 (using hand signals or inertia of a wearable device), brain sensory control 141 (during silent watch) or manual input 145 that is linked to the hand-operable controller 150. Each of these four controls has respective characteristics of response time, accuracy and sensitivity, and they augment each other (instead of creating redundancies). In this way, the command integration unit is driven by a dominant control mode in one particular state according to its characteristic response time, accuracy, sensitivity and environment compatibility, thereby dispensing with any need for command error correction. This also prevents commands from two different modes being treated as two distinct commands, which would result in undesirable movements of the UAV, UGV, UUV, for eg., when the beginning part of a command stream from a mode with short response/process time catches an ending part of a command stream with longer response/process time. In one embodiment, the command integration unit operates on a rule-based mechanism or AI algorithm 205 (for eg., by comparing a current state of the UAV,UGV, UUV with the state of the UAV,UGV,UUV when command signals were received).

In addition, sensitivities of the different input modes of control are different; for eg., some input modes are error-prone to the environment, such as, noise level and lighting condition, whilst other modes are subject to mental distractions. A command priority weighting unit determines the most appropriate dominant command generated from the four control modes.

In the multimodal control 140, priority weighting unit is given to the control mode which gives the highest sensitivity under a particular environment. For eg., in an environment where brightness is low, gesture control 142 will be given low weightage in generating the dominant command signal. However, the user can over-ride the command mode. A reason for giving the user this authority is because the user 101 is often able to assess the most suitable dominant control mode in a given environment. For eg., the user can switch to use brain sensory control 141 for commanding the UAV, UGV, UUV in an environment where voice control 143 was given the highest priority and a noisy environment could cause a false signal to mix in.

In the above description, navigation of the UAV, UGV, UUV can be autonomously controlled from the HUD 110 or switched to manual control at the hand-operable controller 150. Manual UAV, UGV, UUV control mode at the hand-operable controller is given the highest command priority due to less signal interpretation or interference error.

Also, in the above description, comprehensive mapping of the target area 202 or OoI 204 provides situation awareness about the frontline to the user. The user is appraised of the situation, weighs the risks and is enabled to make an informed decision by choosing possible routes to the target area/OoI. Additionally or alternatively, the user can communicate with the Command Centre 190 on choosing on the best possible route. It is also possible that the user relies on the AI rule-based algorithm 205 to recommend the best possible route or to rank the possible routes (as illustrated in FIG. 11) before making a final decision.

While specific embodiments have been described and illustrated for use by a security personnel, it is understood that many changes, modifications, variations and combinations thereof could be made to the present invention without departing from the scope of the present invention for use in civil rescue missions. For eg., the hand-operable controller, UAV, UGV, UUV can be used by a user to conduct surveys of a forest fire, of a building in danger of collapsing, of a building under contamination threat, etc. before or during which rescue personnel is deployed.

The invention claimed is:

1. A tactical advanced robotic engagement system (ARES) comprising:
   a heads-up display (HUD) mounted on a helmet of a user, wherein the HUD comprises four multi-modal buttons located virtually on a user interface (UI), with the four multi-modal buttons being a manual, a voice, a gesture and a brain sensory sensor;
   a one-hand-operable controller mountable on a weapon or tool carried by the user; and
   an unmanned ground vehicle (UGV) and an associated unmanned aerial vehicle (UAV) or unmanned underwater vehicle (UUV);
   wherein: the one-hand operable controller comprises switches to communicate with the UGV and/or UAV (or UUV), and operation of the ARES with the virtual, manual multi-modal button which is given command priority over the other three multi-modal buttons to execute autonomous control of the UGV and/or UAV or UUV reduces visual and mental cognitive loads on the user, enhances the user's situation awareness, enhances decision making with reduced risks, and allows the user to maintain mission-critical, time-critical or safety-critical readiness, thereby to achieve task effectiveness and mission success.

2. The tactical ARES according to claim 1, wherein the one-hand-operable controller comprises a preset button for preset navigational control of the UGV, UAV or UUV and two buttons for programmable speed and directional control, with the two buttons being operable simultaneously for programmable hover control of the UAV or UUV, thereby providing quick response to effective navigation control to the user.

3. The tactical ARES according to claim 1, wherein the one hand-operable controller further comprising a joystick for yaw and roll programmable control and homing of the UAV or UUV to the UGV, wherein homing allows the UAV to return and dock with the UGV for battery charging.

4. The tactical ARES according to claim 1, wherein the one-hand-operable controller further comprises 3D sensors, with outputs of the 3D sensors for gesture control of the UGV and/or UAV or UUV by panning and tilting the one-hand-operable controller.

5. The tactical ARES according to claim 1, further comprising a dead-reckoning algorithm and an AI algorithm, wherein the dead-reckoning algorithm allows the ARES to track and guide the user when GPS is ineffective in a built-up area, and the AI algorithm responds and allows inputs from various sensors deployed in the UGV, UAV or UUV to recommend execution of a strategy plan to reach a target area or object of interest with low risks and high effectiveness.

6. The tactical ARES according to claim 5, wherein the dead-reckoning algorithm and AI algorithm functionalities are built into the HUD, UGV or a command centre.

7. The tactical ARES according to claim 5, wherein the UGV, UAV and HUD have GPS sensors that provide positional nodes, so that locations on a GPS map can be determined with predetermined accuracies.

8. The tactical ARES according to claim 1, wherein the HUD comprises a user health and electric power monitor to notify the user with alerts in order to achieve mission success or to reduce mission failure.

9. The tactical ARES according to claim 1, further comprising a camera mounted on the UAV or UGV for taking photos or videos of a target area or object-of-interest, wherein the photos or videos are transmitted to the HUD or an associated command centre for stitching together to create a strategy map for mission planning.

* * * * *